(12) United States Patent
Lounds

(10) Patent No.: US 8,020,912 B2
(45) Date of Patent: Sep. 20, 2011

(54) REAR CLOSURE ASSEMBLY FOR A PASSENGER VEHICLE

(75) Inventor: Daniel William Lounds, Lapeer, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 12/427,107

(22) Filed: Apr. 21, 2009

(65) Prior Publication Data

US 2010/0264689 A1 Oct. 21, 2010

(51) Int. Cl.
*B62D 25/10* (2006.01)
(52) U.S. Cl. .......................................... 296/57.1; 296/76
(58) Field of Classification Search ............... 296/50, 296/51, 56, 57.1, 76, 146.8
See application file for complete search history.

(56) References Cited

U.S. PATENT DOCUMENTS

| | | | |
|---|---|---|---|
| 3,713,472 A | 1/1973 | Dozois | |
| 4,184,709 A | 1/1980 | Kim | |
| 4,413,854 A | 11/1983 | Hirshberg | |
| 4,434,919 A * | 3/1984 | Flowers | 224/42.21 |
| 4,664,437 A | 5/1987 | Queveau | |
| 5,692,792 A | 12/1997 | Klar | |
| 6,174,015 B1 | 1/2001 | Shave | |
| 6,318,782 B1 | 11/2001 | Suzuki et al. | |
| 6,361,097 B1 * | 3/2002 | Lechkun | 296/37.1 |
| 6,454,341 B2 | 9/2002 | Tolinski | |
| 6,471,279 B2 * | 10/2002 | Pommeret | 296/57.1 |
| 6,644,707 B2 * | 11/2003 | McLaughlin et al. | 296/26.09 |
| 6,783,170 B1 * | 8/2004 | Van Den Acker et al. | 296/146.16 |
| 7,332,636 B2 * | 2/2008 | Xu et al. | 585/640 |
| 7,354,095 B2 * | 4/2008 | Fleming et al. | 296/107.18 |
| 7,401,832 B2 * | 7/2008 | Yui et al. | 296/57.1 |
| 7,513,556 B2 * | 4/2009 | Tomasson | 296/64 |
| 7,651,148 B2 * | 1/2010 | Hustyi et al. | 296/76 |
| 7,735,890 B2 * | 6/2010 | Pollak | 296/26.08 |
| 7,762,608 B2 * | 7/2010 | Gersmann et al. | 296/76 |
| 2007/0046060 A1 * | 3/2007 | Werner | 296/51 |
| 2007/0170739 A1 * | 7/2007 | Sims | 296/26.11 |
| 2008/0191507 A1 * | 8/2008 | Farber | 296/57.1 |
| 2009/0051195 A1 | 2/2009 | Ewing | |
| 2009/0243329 A1 * | 10/2009 | Hustyi et al. | 296/76 |
| 2010/0201151 A1 * | 8/2010 | Ewing | 296/146.13 |

FOREIGN PATENT DOCUMENTS

DE 10038604 A1 2/2002
* cited by examiner

*Primary Examiner* — Glenn Dayoan
*Assistant Examiner* — Gregory Blankenship
(74) *Attorney, Agent, or Firm* — Gregory Brown; Brooks Kushman P.C.

(57) ABSTRACT

A passenger vehicle is provided with a body having an interior with a passenger compartment and a rear cargo region accessed through a rear opening. A liftgate and tailgate are pivotally coupled to the body at an upper and lower periphery of the opening respectively, and engage one another to enclose the opening. The liftgate and tailgate each enclose a portion of the opening in a closed position and provide access to the rear cargo area in an open position. A passenger vehicle is provided with a vehicle body having an interior and a rear opening with a first and second region facing generally upwards and rearwards respectively, both regions providing access to the rear cargo area. A rear closure assembly encloses the opening, provides access to the rear cargo area, and has first and second members pivotally connected to the body to enclose the first and second regions respectively.

13 Claims, 2 Drawing Sheets

REAR CLOSURE ASSEMBLY FOR A PASSENGER VEHICLE

BACKGROUND

1. Technical Field

Embodiments of the invention relate generally to enclosures for a rear cargo region of a passenger vehicle.

2. Background Art

Conventional passenger vehicles such as sedans and coupes did not offer the functionality and versatility as they do today. Traditionally, sport utility vehicles (SUVs), minivans, station wagons, and crossovers were the ideal choice for hauling oversized or numerous pieces of luggage. Today, conventional passenger vehicle are closing the gap and becoming more efficient for transporting larger cargo loads while providing competitive gas mileage.

While folding rear seats and vehicle packaging improvements have contributed to the ability of conventional passenger vehicles to haul large objects, most struggle in transporting elongate articles. Many drivers attempt to stow these elongated objects extending from the trunk over the front console and up into the front dash. This practice can lead to obstructed driver views, scrapes along the front dash and console, and is impracticable for loading and unloading the object. Also, when elongate articles are stowed extending from the trunk, the trunk is left open with the trunk lid blocking a rear field of view of the driver.

SUMMARY

One embodiment on the invention discloses a passenger vehicle with a body having an interior with a passenger compartment and a rear cargo region with a rear opening for providing access thereto. A liftgate is pivotally coupled to the body at an upper periphery of the rear opening. A tailgate is pivotally coupled to the body at a lower periphery of the rear opening. The liftgate and reargate engage one another to collectively enclose the rear opening.

Another embodiment of the invention discloses a passenger vehicle having a vehicle body with a front end and a rear end. The vehicle body has an interior with a passenger compartment and a rear cargo region, and a rear opening for providing access to the rear cargo region. A first closure member is operably coupled to the vehicle body at an upper peripheral region of the rear opening for enclosing a first portion of the rear opening in a closed position and providing access to the rear cargo area in an open position. A second closure member is operably coupled to the vehicle body at a lower peripheral region of the rear opening for enclosing a second portion of the rear opening in a closed position and providing access to the rear cargo area in an open position. The first and second closure members engage one another when in their respective closed positions to collectively enclose the rear opening of the rear cargo area.

Yet another embodiment discloses a passenger vehicle having a vehicle body with a front end, a rear end, a top end, an interior, and a rear opening. The rear opening has a first region facing generally upwards and a second region facing generally rearward, both regions providing access to the interior. A rear closure assembly selectively encloses the rear opening and provides access to the interior. The rear closure assembly has a first member pivotally connected to the vehicle body to selectively enclose the first region, and a second member pivotally connected to the vehicle body to selectively enclose the second region.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
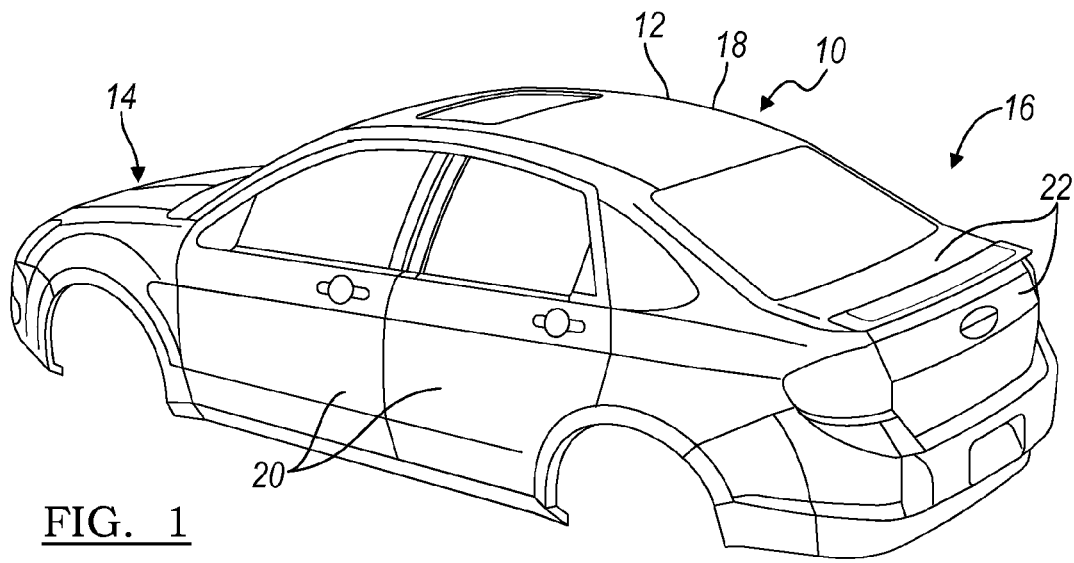
FIG. 1 is a perspective view of a passenger vehicle according to an embodiment of the invention.

Referring to FIG. 1, a passenger vehicle 10 is illustrated according to an embodiment. The passenger vehicle 10 has a vehicle body 12 generally defined by a front end 14, rear end 16, and roof 18. The interior of the vehicle body 12 has a passenger area accessed through the vehicle doors 20 and a rear cargo area 21 accessed through a rear closure assembly 22. The rear closure assembly 22 allows for improved cargo access and the ability for improved transport of elongated or otherwise large objects in a passenger vehicle 10. The rear closure assembly 22 does not unduly affect vehicle aesthetics, complexity, or performance.

Figure 3:
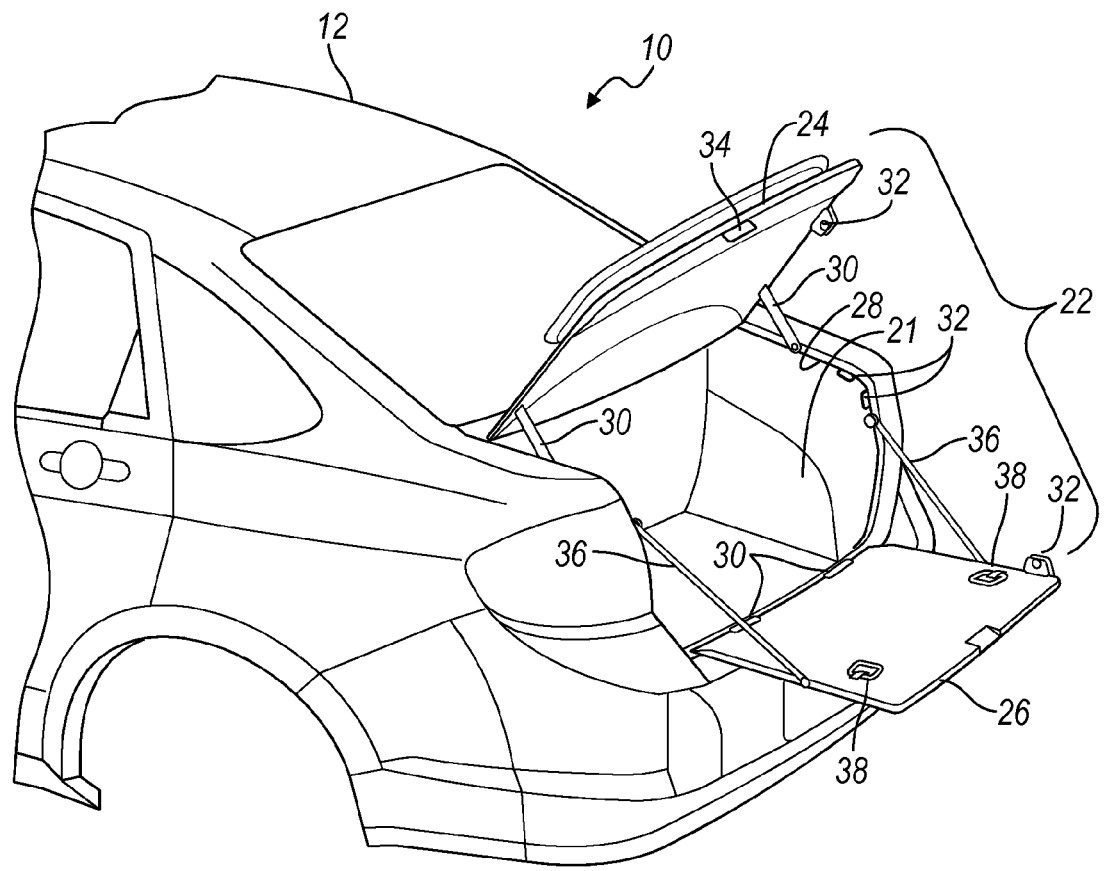
FIG. 3 is a partial perspective view of the passenger vehicle of FIG. 1.
Figure 2:
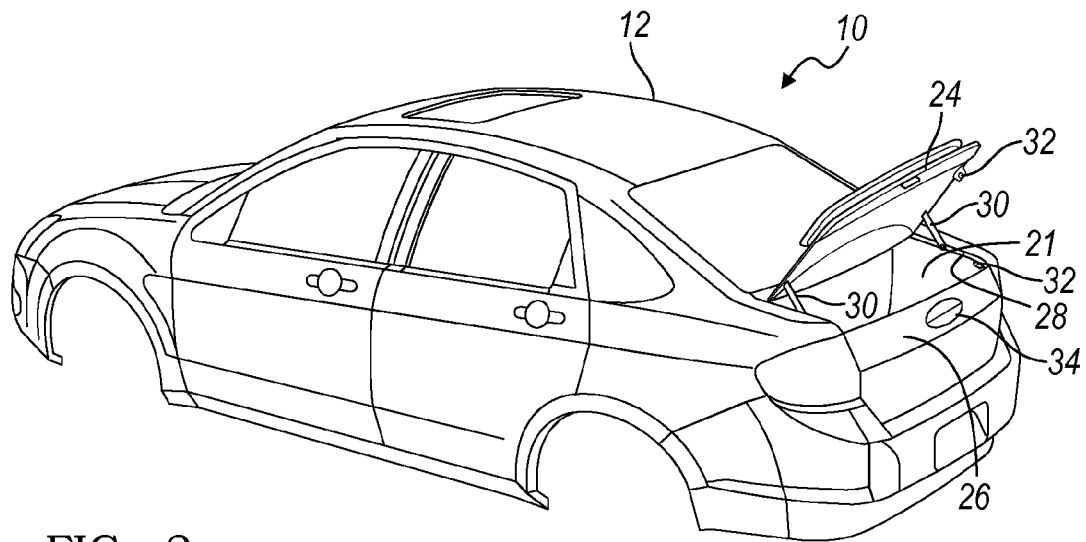
FIG. 2 is a perspective view of the passenger vehicle of FIG. 1.
Figure 4:
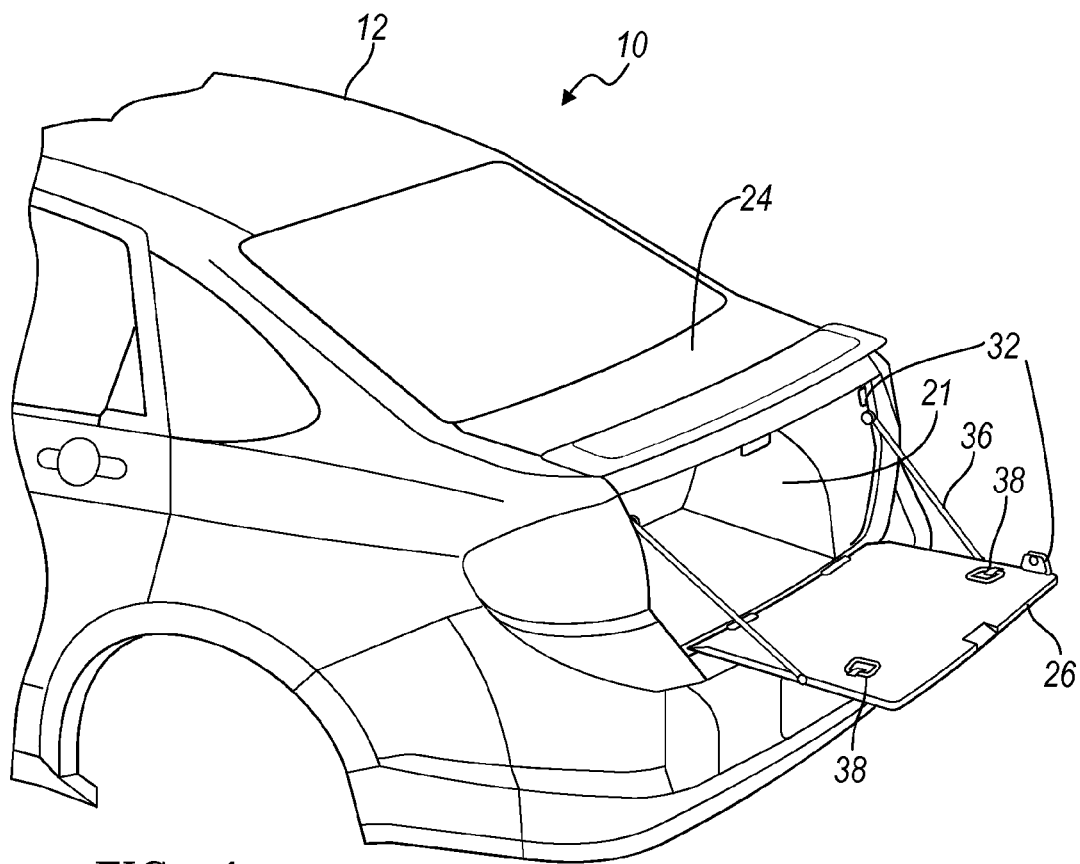
FIG. 4 is a partial perspective view of the passenger vehicle of FIG. 1.

Referring now to FIGS. 2-4, the rear closure assembly 22 is shown in varying positions of use. The rear closure assembly 22 has a liftgate 24 and a tailgate 26 operably coupled to the vehicle body 12. The liftgate 24 and tailgate 26 are pivotally connected to the vehicle body adjacent to the upper and lower peripheries of the opening 28 to the rear cargo area 21 respectively through the use of hinges 30, multi-bar linkages, or other pivoting systems for trunks, decklids, liftgates, and tailgates that are commonly known in the art.

The liftgate 24 and tailgate 26 engage and cooperate to collectively enclose the rear cargo area 21 in a closed position or provide access to the rear cargo area 21 in an open position. The general operation of the liftgate 24 and tailgate 26 can be described as clamshell. The liftgate 24 encloses and provides access to a first portion of the rear cargo area 21 in a closed and open position respectively. The tailgate encloses and provides access to a second portion of the rear cargo area 21 in a closed and open position respectively. In another embodiment, the liftgate 24 and tailgate 26 are contemplated as first and second closure members, each enclosing a respective portion of the rear cargo area 21.

FIG. 2 depicts the rear closure assembly 22 with the liftgate 24 in an open position and the tailgate 26 in a closed position. In one embodiment, the hinge system 30 of the liftgate 24 allows for the liftgate 24 to lift up and away from both the vehicle body 12 and the opening 28 for the rear cargo area 21, and allows for improved access and clearance into the rear cargo area 21. The hinge system 30 of the liftgate 24 may additionally have a gas strut, spring loaded component, or pneumatic or hydraulic cylinder in order to assist the liftgate 24 in remaining open once it is in an open position. The gas strut or other similar component prevents wind, the weight of the liftgate 24, or other outside influences from causing the liftgate 24 to close while the rear cargo area 21 is open and potentially being accessed.

In this embodiment, the liftgate 24 has a pair of latch assemblies 32 that release in order to open it, although only one latch assembly 32 could be used. The latch assembly 32 is a latch and striker bar or other known latching system. The latch assembly 32 has either the latch or the striker bar located on a lateral end of the liftgate 24, and the other component of the latch assembly 32 located on the vehicle body 12 adjacent to the opening 28 and in a position such that the striker bar engages the latch when the liftgate 24 is in the closed position. The pair of latch assemblies 32 are connected to a handle 34 to release the latch assemblies and open the liftgate 24. The handle 34 is a traditional lever style handle, a soft touch release handle, or other handle system as known in the art. The latch assemblies 32 may also have a locking system. In other embodiments, the latch assemblies 32 for the liftgate 24 are capable of releasing based on a release button in the passenger compartment or via other remote release systems, such as through a keyless entry system as used with conventional passenger vehicle trunks. The liftgate 24 can be equipped with rubber stops or a motorized trunk pulldown feature for ease of closure.

The tailgate 26 has a pair of latch assemblies 32 that retain the tailgate 26 in a closed position as shown in FIG. 2, and release in order to open it. Only one latch assembly 32 could also be used. The tailgate 26 could also be retained in the closed position by a pair of detent pins engaging both the tailgate 26 and the vehicle body 12.

The latch assembly 32 for the tailgate 26 has either the latch or the striker bar located on a lateral end of the tailgate 26, and the other component of the latch assembly 32 located on the vehicle body 12 adjacent to the opening 28 and in a position such that the striker engages the latch when the tailgate 26 is in the closed position. The pair of latch assemblies 32 is connected to a handle 34 to release the latch assemblies and open the tailgate 26. The handle 34 is a traditional lever style handle, a soft touch release handle, or other handle system as known in the art. The latch assemblies 32 may also have a locking system.

In another embodiment, a latch assembly 32 is used to directly connect the liftgate 24 to the tailgate 26 when both are in the closed position to enclose the rear cargo area 21. The latch and striker bar of the latch assembly 32 are located on the liftgate 24 and tailgate 26 or vice versa, such that the striker bar engages the latch. In this embodiment, the liftgate 24 opens when the latch assembly 32 is released, while the tailgate 26 is retained in a closed position through the use of detent pins or other retaining mechanisms between the vehicle body 12 and the tailgate 26.

FIG. 3 depicts the rear closure assembly 22 with both the liftgate 24 and tailgate 26 in an open position, allowing for easy access to the rear cargo area 21 for stowing cargo, luggage, or other similar items. This configuration is a easy load mode for the rear closure assembly 22. In one embodiment, the liftgate 24 is opened first and allows the tailgate 26 to then be opened. To enclose the rear cargo region, the tailgate 26 is closed prior to closing the liftgate 24.

In another embodiment, the liftgate 24 and tailgate 26 operate independently from one another. Either liftgate 24 or tailgate 26 is able to close when the other is in an open or closed position. Similarly, either liftgate 24 or tailgate 26 is able to open when the other is in an open or closed position. The liftgate 24 is opened and closed independently of and irrespective of the position of the tailgate 26, and vice versa.

In yet another embodiment, the tailgate 26 is opened first in order to allow the liftgate 24 to be opened, and similarly the liftgate 24 is closed first in order to close the tailgate 26. Alternatively, the rear closure assembly 22 could have a cooperating release system where both the liftgate 24 and tailgate 26 are capable of opening simultaneously, and either closing simultaneously or in a specified order, such as the tailgate 26 before the liftgate 24.

The tailgate 26 has a pair of overload attachments 36, although only one could be used, each overload attachment 26 connects a lateral side of the tailgate 26 to the vehicle body 12. The overload attachments 36 prevent the tailgate 26 from pivoting open past a position approximately flush with the floor of the rear cargo area 21. The overload attachment 36 can be a cable, a gas strut, or the like. The overload attachments 36 also provide added structural support for the tailgate 26 when cargo being carried extends over and is supported by the tailgate 26. The tailgate 26 is also provided with tie down members 38 such as hooks to secure cargo to the tailgate 26 using rope, bungee cords, straps, or other attachment methods while the vehicle 10 is in transit to prevent the cargo from moving in the rear cargo area 21 or from exiting or falling out of the vehicle 10.

In FIG. 4, the tailgate 26 is in an open position, while the liftgate 24 is in a closed position. This configuration of the rear closure assembly 22 is a convenient hauling mode and allows for transportation of elongated cargo items in the passenger vehicle 10 by allowing the cargo to extend beyond the rear 16 of the vehicle 10 while still supporting the cargo with the tailgate 26. The tailgate 26 has overload attachments 36 and tie down members 38.

The liftgate 24 has latch assemblies 32 connecting it to the vehicle body 12 and retaining the liftgate 24 in the closed position. The latch assemblies 32 of the tailgate 26 were released to open the tailgate 26 and the latch assemblies 32 either latch the tailgate 26 to the vehicle body 12 or to the liftgate 24. If the latch assemblies connect the tailgate 26 to the vehicle body 12, the tailgate 26 opens either independently of the position of the liftgate 24, or the liftgate 24 may have to be briefly opened to allow the tailgate 26 to open if there is a sealing lip or other clearance interference between the liftgate 24 and tailgate 26.

The liftgate 24 is latched in a closed position in FIG. 4 such that the driver of the vehicle 10 continues to have visibility through the rear windshield, a blind spot is not created, and there is not a reduction in visibility. In one embodiment the passenger vehicle 10 has rear passenger seats with a pass-through mechanism to allow longer cargo items from the rear cargo area 21 to extend into the passenger compartment. Alternatively, the rear passenger seat folds forward either as an entire seat, or in a split seating arrangement to allow the longer cargo item to extend from the rear cargo area 21 into the passenger compartment While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A passenger vehicle comprising:
a vehicle body having a front end and a rear end, the vehicle body having an interior with a passenger compartment and a rear cargo region, the vehicle body having a rear opening with a first region facing generally upwards and a second region facing generally rearward for providing access to the rear cargo region;

a first closure member operably coupled to the vehicle body at an upper peripheral region of the rear opening for enclosing the first portion region of the rear opening in a closed position and providing access to the rear cargo area in an open position;

a second closure member operably coupled to the vehicle body at a lower peripheral region of the rear opening for enclosing the second portion region of the rear opening in a closed position and providing access to the rear cargo area in an open position;

a first latch assembly for operably and releasably coupling the first closure member to the second closure member; and a second latch assembly having a first portion oriented at a lateral end of one of the first and second closure members, and a second portion at a corresponding side peripheral region of the vehicle body;

wherein the first and second closure members engage adjoin one another when in their respective closed positions to collectively enclose the rear opening of the rear cargo area.

2. The passenger vehicle of claim 1 further comprising a handle oriented on the first closure member, operably connected to the first latch assembly of the first closure member to release the first closure member from the closed position to the open position.

3. The passenger vehicle of claim 1 further comprising a handle oriented on the second closure member, operably connected to the first latch assembly of the second closure member to release the second closure member from the closed position to the open position.

4. The passenger vehicle of claim 1 further comprising at least one tie down member extending from the second closure member for securing cargo to the second enclosure member.

5. The passenger vehicle of claim 1 further comprising at least one overload attachment, the overload attachment extending from a side peripheral region of the rear cargo opening to a corresponding lateral side of the second closure member.

6. The passenger vehicle of claim 5 wherein the overload attachment further comprises a cable attachment.

7. The passenger vehicle of claim 5 wherein the overload attachment further comprises a gas strut.

8. A passenger vehicle comprising:

a vehicle body having a front end, a rear end, a top end, an interior, and a rear opening having a first region facing generally upwards and a second region facing generally rearward, both regions for providing access to the interior; and a rear closure assembly for selectively enclosing the rear opening and providing access to the interior, the rear closure assembly having a first member pivotally connected to the vehicle body to selectively enclose the first region, the rear closure assembly having a second member pivotally connected to the vehicle body to selectively enclose the second region, wherein the first member provides both access and enclosure of the first region of the rear opening while the second member provides both access and enclosure of the second region of the rear opening, and the position of the first and second members are independent of one another;

at least one latch assembly connected to the first member of the rear closure assembly and the vehicle body for releasably retaining the first member in a closed position and enclosing the first region; and a latch assembly for releasably retaining the second member to the first member of the rear closure assembly, the first and second members collectively enclosing the rear opening when the single latch assembly is engaged.

9. The passenger vehicle of claim 8 further comprising at least one latch assembly connected to the second member of the rear closure assembly and the vehicle body for releasably retaining the second member in a closed position and enclosing the second region.

10. The passenger vehicle of claim 8 further comprising a handle oriented on the first member of the rear closure assembly, operably connected to the at least one latch assembly to release the first member from the closed position to the open position.

11. The passenger vehicle of claim 8 further comprising a handle oriented on the second member of the rear closure assembly, operably connected to the at least one latch assembly of the second closure member to release the second closure member from the closed position to the open position.

12. The passenger vehicle of claim 8 further comprising at least one tie down member extending from the second member for securing cargo to the second member of the rear closure assembly.

13. A passenger vehicle comprising:

a body having a rear opening with an upward-facing region and a rearward-facing region;

a liftgate pivotally connected to the body to selectively enclose the upward-facing region;

a tailgate pivotally connected to the body to selectively enclose the rearward-facing region independent of the liftgate position;

a first latch for releasably retaining the liftgate to the body; and a second latch for releasably retaining the liftgate to the tailgate.

* * * * *